United States Patent
Freeman

(10) Patent No.: US 7,223,436 B2
(45) Date of Patent: *May 29, 2007

(54) ANIMAL FEED, METHOD FOR PREPARING ANIMAL FEED, AND METHOD FOR FEEDING AN ANIMAL

(75) Inventor: Daniel R. Freeman, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 629 days.

This patent is subject to a terminal disclaimer.

(21) Appl. No.: 10/723,560

(22) Filed: Dec. 10, 2003

(65) Prior Publication Data

US 2005/0048163 A1 Mar. 3, 2005

Related U.S. Application Data

(63) Continuation of application No. 09/901,342, filed on Jul. 9, 2001, now Pat. No. 6,746,698.

(51) Int. Cl.
*A23K 1/00* (2006.01)

(52) U.S. Cl. ............... 426/623; 426/630; 426/635; 426/2; 426/74; 426/807

(58) Field of Classification Search ............... 426/2, 426/74, 623, 630, 635, 454, 807
See application file for complete search history.

(56) References Cited

U.S. PATENT DOCUMENTS

| | | | |
|---|---|---|---|
| 2,801,955 A | 8/1957 | Rutenberg et al. | |
| 2,868,778 A | 1/1959 | Watson et al. | |
| 3,716,526 A | 2/1973 | Schweiger | |
| 4,038,481 A | 7/1977 | Antrim et al. | |
| 4,048,268 A | 9/1977 | Ludwig | |
| 4,349,578 A | 9/1982 | Wright et al. | |
| 4,708,877 A | 11/1987 | Donovan et al. | |
| 4,976,977 A | 12/1990 | Johnson et al. | |
| 4,988,520 A | 1/1991 | Overton | |
| 5,102,671 A | 4/1992 | Coles | |
| 5,227,190 A | 7/1993 | Ward | |
| 5,503,668 A | 4/1996 | Giesfeldt et al. | |
| 5,714,184 A | 2/1998 | Major | |
| 5,855,659 A | 1/1999 | Giesfeldt et al. | |
| 5,871,802 A * | 2/1999 | Gao et al. ............... | 426/635 |
| 5,972,091 A | 10/1999 | Giesfeldt et al. | |
| 6,113,974 A | 9/2000 | Winowiski et al. | |
| 6,746,698 B2 | 6/2004 | Freeman | |

FOREIGN PATENT DOCUMENTS

| | | |
|---|---|---|
| EP | 0 598 920 | 6/1994 |
| EP | 0 804 883 | 11/1997 |
| GB | 1 600 162 | 10/1981 |

\* cited by examiner

*Primary Examiner*—C. Sayala
(74) *Attorney, Agent, or Firm*—Banner & Witcoff, Ltd.

(57) ABSTRACT

Disclosed is an animal feed. The animal feed includes fat, preferably vegetable oil; a solid nutritive source; such as a whole seed or grain or a fraction thereof; and a binder, the binder comprising hemicellulose. Also disclosed are methods for preparing an animal feed and for feeding an animal. When formulated into pellets, the disclosed animal feeds have excellent durability, such that pellet fracture and dust formation are minimized.

1 Claim, No Drawings

ANIMAL FEED, METHOD FOR PREPARING ANIMAL FEED, AND METHOD FOR FEEDING AN ANIMAL

TECHNICAL FIELD OF THE INVENTION

The invention is in the field of animal feeds. More specifically, the preferred embodiments of the invention are in the field of high-fat animal feed pellets.

BACKGROUND OF THE INVENTION

It is desirable to provide an animal feed in the form of a formulated ration that contains desired and necessary nutrients. The preferred presentation of the formulated ration is in the form of a compact pellet. Such pellets are convenient for the operator to provide to the animal, and are palatable to the animal.

Often, it is desired to provide a high-fat animal feed in order to supply the animal with optimum nutritional energy. It is difficult, however, to incorporate high levels of fat into a pelletized formula. Specifically, when an animal feed pellet is formulated with a fat level greater than about 10% by weight, the intrapellet cohesive strength is substantially weakened, thereby making the pellet more likely to fracture and to create dust and wastage.

In recognition of this problem, the prior art has provided numerous pellet binders in an attempt to improve the intrapellet cohesive strength of animal feed pellets. For instance, the use of inorganic binders composed of calcium salts is taught in U.S. Pat. Nos. 4,988,520, 5,714,184 teaches the use of the digest of wood chips with soda ash as a binder in animal feeds. Condensed soybean solubles are used as the binder in animal feed blocks in U.S. Pat. Nos. 4,349,578, and 5,871,802 teaches the use of liquid by-products such as corn steep liquor and condensed distillery solubles as binders in animal feed pellets. Wheat gluten is taught as the binder for animal feed pellets in U.S. Pat. No. 5,102,671, and hydrolyzed starch is used as the binder in U.S. Pat. No. 4,048,268 for extruded animal feeds made to contain antibiotics. Another document, U.S. Pat. No. 4,976,977, teaches a combination of clay and molasses as a pelleting agent for animal feed. Collagen, an animal-derived binder, also is sometimes used as a binder.

For various reasons, the binders taught in the foregoing references are less than satisfactory. Generally, the binders taught in the foregoing references allow modest levels of fat to be incorporated into the pelleted product, but such binders are not suitable for higher fat animal feeds. Certain of the foregoing binders suffer from other drawbacks. For instance, recent outbreaks of transmissible spongiform encephalopathies, such as Bovine Spongiform Encephalopathy (commonly known as "mad cow disease") have received concerns about the safety of use of animal-derived products such as collagen in feedstocks for other animals.

At present, the most common method for providing high-fat animal feeds is to formulate a low-fat feed and to spray a vegetable fat onto the feed. However, although fat levels can be increased using the foregoing technique, other difficulties arise. For instance, the fat-covered feed is difficult to handle and transport. For these and other reasons, fat-sprayed feeds are generally unsatisfactory.

In light of the drawbacks inherent in the foregoing known binders and feeds, it is a general object of the invention to provide an animal feed that incorporates a satisfactory binder.

THE INVENTION

It has now been discovered that hemicellulose, in particular corn hull hemicellulose, possess superior properties when used as an animal feed binder. Hemicellulose, a soluble component of agricultural residues such a corn hulls and other cellulose-containing materials, is readily obtainable via the alkaline cooking of corn hulls and other corn components, as is taught in U.S. Pat. Nos. 2,801,955; 3,716,526; 2,868,778; 5,972,091; 5,855,659; 5,503,668 and 4,038,481, and in published International Application No. WO 98US/05551.

In accordance with one embodiment of the invention, an animal feed that includes a fat, the fat being present in an amount effective to provide nutrititive fat to an animal; a solid nutritive source; and a hemicellulose binder, the hemicellulose binder being present in at least an amount effective to substantially provide intraparticle cohesion, is provided. The animal feed is provided in the form of discrete plural particles of a size suitable for feeding to an animal. Preferably, the animal feed is in the form of pellets, by which is contemplated particles produced by a pellet mill in a pelletizing process.

Other features of the invention are set forth hereinbelow and in the appended claims.

DESCRIPTION OF PREFERRED EMBODIMENTS

The adhesive used in connection with the invention comprises hemicellulose, and most preferably comprises hemicellulose and water. Hemicellulose preferably is obtained from corn hulls, a by-product from the corn wet milling industry.

Hemicellulose also can be obtained from corn bran, a by-product from the corn dry milling industry; from spent germ, also from the corn wet milling industry; or from spent germ from the corn dry milling industry. All of these products are by-products, either from the isolation of corn starch, corn protein and corn oil in the case of the corn wet milling industry, or from the isolation of corn flour and corn oil in the case of the corn dry milling industry. Because of the high hemicellulose content in corn hulls and the ready availability of corn hulls, corn hulls are the preferred source for hemicellulose used in conjunction with the invention. Other suitable sources for hemicellulose include other seed sources, such as wheat, oats, and soybeans. Most preferably, the adhesive composition includes the liquid fraction resulting from alkaline cooking of a hemicellulose-containing agricultural residue, which most preferably is a corn hull residue.

Hemicellulose is present in the animal feed in any amount effective to improve intraparticle cohesion as compared to a similar particle made without the hemicellulose. Generally, the animal feed particle will be deemed to have sufficient intraparticle cohesion when the particle is suitable for ordinary transport and use as in animal feed. Most preferably, the intraparticle cohesion is such that the feed has a durability no greater than 2.0, as determined via analysis with a RoTap sieve shaker (as set forth in more detail in Example 6). To achieve a feed with this level of durability, the hemicellulose preferably is present in the animal feed in an amount ranging from about 0.2% to about 10% by weight of the animal feed. More preferably, the hemicellulose is present in an amount from about 0.5% to about 8%; even more preferably, an amount ranging from about 1% to about 6%; and even more preferably, an amount ranging from about 2% to about 4%.

The animal feed composition further includes a fat. It is contemplated that any animal and/or vegetable fat may be useful in conjunction with the invention. Suitable examples of vegetable fat include corn oil and soy oil. For instance, in one embodiment of the invention, full-fat corn germ is used as a starting material in fabricating the animal feed. An example of a suitable animal fat is choice white grease, a swine-derived fat. However, particularly in light of the growing concern over incorporation of animal by-products into animal feeds, preferred embodiments of the invention do not include animal fat.

The fat may be present in the animal feed in any amount effective to provide nutritive fat to the animal. It is contemplated that the fat content may vary depending upon the animal or upon the intended nutritive qualities of the feed. Generally, it is preferred that the fat is present in the animal feed in an amount of at least 5% by weight of the feed. More preferably, the fat is present in an amount of at least about 10%; even more preferably, an amount of at least about 15%; even more preferably, an amount of at least about 17%; even more preferably, an amount of at least about 20%; and even more preferably, an amount of at least about 25% by weight of the animal feed. It is contemplated that two or more fat sources may be included in the feed; if such is the case, the total fat amount preferably falls within one or more of the foregoing ranges.

The animal feed further includes a solid nutritive source. Any suitable solid nutritive source may be used in conjunction with the invention, and thus, for instance, the solid nutritive source may comprise a whole grain, such as whole wheat, whole rice, whole corn, or whole barley. The solid nutritive source alternatively may comprise a nutritive grain fraction, such as nutritive wheat, nutritive rice, nutritive corn, or nutritive barley fraction. Other nutritive sources include those derived from soy, oats, sorghum, and the like. The nutritive source may include other nutritive sources, including sources (such as molasses solids) that are initially provided in liquid form. The solid nutritive source may be present in the animal feed in any suitable amount. In the case of a somewhat low-fat feed, it is contemplated that the solid nutritive source may be present in an amount of 95% or greater. In more preferred embodiments of the invention, the solid nutritive source is present in an amount of at least about 60%, more preferably, an amount of at least about 70% by weight of the animal feed.

It is highly preferred that the nutritive source include a protein source, which may be present in any amount effective to provide protein to the animal. Protein preferably is present in an amount ranging from about 5% to about 40% by weight of the animal feed. Young swine are particularly needy of protein, and protein contents in the upper portion of this range (e.g., a protein content of about 36%) are preferred in feeds intended for such swine. More preferably, for feeds for other animals, the protein is present in an amount ranging from about 10% to about 30% by weight of the animal feed; even more preferably, the protein is present in an amount ranging from about 15% to about 20% by weight of the animal feed.

It is further preferred that the animal feed include a fiber source. Generally, sources of fiber, such as soybean hulls, rice hulls, corn hulls, cottonseed, wheat hulls, and the like are considered largely non-nutritive (at least in the case of non-ruminant animals). In any case, regardless of whether the animal feed is intended for use by ruminants, the feed preferably includes such fiber source in an amount effective to provide fiber to the animal. Different feed formulas for different animals vary greatly in the amount of fiber desired. Preferably, the fiber source is prepared in an amount ranging from about 1% to about 25% by weight of the animal feed, the percentage being expressed by the bulk weight of the hulls or other source.

In any event, the feed may further include additional materials. For instance, the feed may include one or more vitamins or nutritive minerals, or, more generally, any other suitable nutritive source or other suitable ingredients. As but one example, the feed may include one or more antibiotics.

All of the foregoing ranges are intended to provide general guidelines as to the amount of ingredients suitable for use in the compositions of the invention. The actual composition of an animal feed may vary, depending on factors such as the type of animal and the desired levels of fat, fiber, nutrients, and other materials.

The animal feed may be prepared by any method known in the art or otherwise found to be suitable. Generally speaking, the animal feed is prepared by combining the ingredients of the animal feed to form a mixture, and forming discrete plural particles of the animal feed from the mixture. Most preferably, the particles are formed by pelletizing the mixture. Those skilled in the art of pelletizing will appreciate that various conditions may be employed during the pelletizing process. Generally speaking, moisture levels in the pellet mill may range from about 5% to about 12%, with a product temperature ranging from about 120° F. to about 250° F. In the preparation of one horse feed, for instance, the pelletizer was operated under the following conditions:

| | |
|---|---|
| Feed Rate | 1 lb./min. |
| Feed Moisture | 9.0% |
| Conditioner Temperature | 145° F. |
| Mill Die | 3/16 in. × 1½ in. |
| Mill RPMs | 450 |
| Mill amps | 2.8 |
| Product Temperature | 145° F. |
| Product Moisture | 10.5% |

The size of the pellets preferably ranges from about 1/16 in. to about 1 in. Preferably, when the feed is intended to a larger animal such as a horse or cow, the size ranges from about 1/8 in. to about 5/32 in. When the feed is intended for a smaller animal, such as a rabbit or a small dog, the size of the pellets preferably ranges from about 3/32 in. to about 1/8 in. The size may be controlled by selecting a die of appropriate dimensions.

The animal feed need not be provided to an animal in any special form, but, in preferred embodiments, the feed is simply fed to an animal. It is contemplated, for instance, the animal feed may be useful in conjunction with the feeding of a horse, a cow, a sheep, a pig, a rabbit, a guinea pig, a gerbil, a cat, a dog, and more generally, any other animal. It is further contemplated in some embodiments that the product of the invention may be provided in a form intended and suitable for human consumption, i.e., that the "animal" is a human and that the "feed" is a foodstuff intended for human consumption (e.g., an energy bar). It will be appreciated that both the composition of the animal feed and the size of the particles will be expected to vary depending on the animal for which the feed is intended. In any event, other ingredients, such as colorants, flavorings, and the like may be incorporated in the feed.

The following Examples are provided to illustrate the invention, but should not be construed as limiting in scope.

EXAMPLE 1

Preparation of Adhesive Composition

Seven hundred fifty g dry basis finely ground corn hulls containing 51.3 g water was added to sufficient water to give a total weight of 8333 g. The pH of the stirred slurry was adjusted to 7.0 with $Ca(OH)_2$, and then 50 g $Ca(OH)_2$ was added. The resulting slurry was continuously jet-cooked at a rate of 0.185 gallons per minute using high pressure steam. The conditions of the jet cook were: Temperature=~305° F., Pressure=~70 p.s.i.g., Retention Time=~14.1 minutes.

EXAMPLE 1A

Preparation of Adhesive Composition

An adhesive composition was prepared as in Example 1, except that the reaction mixture was vacuum filtered across a filter which had been precoated with diatomaceous earth. The pH of the filtrate was adjusted to about 6.5 with $CO_2$ and the solution was spray dried. The product thus formed was useful as a ready-mix adhesive. A satisfactory adhesive may be formed by mixing the adhesive with water at a ratio of 12 parts dry weight adhesive to 88 parts water.

EXAMPLE 2

Preparation of Adhesive Composition

Two hundred g dry basis finely ground corn hulls was added to sufficient water to give a total weight of 2000 g. The pH of the stirred slurry was adjusted to 7.0 with $Ca(OH)_2$, and then 14.23 g $Ca(OH)_2$ was added. The resulting slurry was batch cooked with stirring at atmospheric pressure at 212° F. for two hours.

EXAMPLE 3

Preparation of Adhesive Composition

Corn hulls from a corn wet-milling process were extrusion cooked with NaOH in a Wenger TX-57 Twin Screw Extruder according to the following conditions:
Extruder speed=208 rpm
Feed Rate=145 pounds per hour
50% NaOH=216 milliliters per minute
Steam=4 pounds per hour
Water=15 pounds per hour
Barrel #1 Temperature=111° F.
Barrel #2 Temperature=240° F.
Barrel #3 Temperature=332° F.
Barrel #4 Temperature=332° F.
Barrel #5 Temperature=270° F.

The extruded product was dried in a moving grate drier and ground into a coarse powder. The resulting coarsely ground dried extrudate was formulated into an adhesive paste by mixing 15 parts by weight coarsely ground extruder product with 85 parts water.

EXAMPLE 4

Preparation of Adhesive Composition

Five hundred g dry basis corn hulls containing 766 g water was added to sufficient water to give a total weight of 5000 g. The stirred slurry was heated and maintained at 82° C. to 96° C. for two hours. The hot slurry was then filtered through a No. 60 Mesh A.S.T.M.E. Standard Testing Sieve. The retained solids were subjected to a second treatment of slurrying, stewing, and filtering, and then to a third treatment of slurrying, stewing, and filtering. The retained solids were crumbled, placed on screens, and allowed to air-dry at room temperature.

One hundred g dry basis of the treated corn hulls thus obtained were added to a solution already containing 1610 mL 190 proof ethanol, 390 mL water, and 20 g 50% NaOH in a reaction flask equipped with a reflux condenser and mechanical stirring. The stirred reaction mixture was heated to the reflux temperature and then refluxed for three hours at the reflux temperature of 78° C. The reaction mixture was cooled to 40° C., and then it was vacuum filtered across a 40-60° C. fritted glass funnel. The retained solids were returned to the reaction flask and reslurried in a solution already containing 1610 mL 190 proof ethanol and 390 mL water. The slurry was heated to reflux temperature and then refluxed for one hour at the reflux temperature of 78° C. The reaction mixture was cooled to 20° C., and then it was vacuum filtered across a 40-60° C. fritted glass funnel. The retained solids were reslurried in a solution already containing 1610 mL 190 proof ethanol and 390 mL water at 20° C., and then the pH of the slurry was adjusted to 6.5 with 5.8N hydrochloric acid. The slurry was then vacuum filtered across a 40-60° C. fritted glass funnel.

The retained solids were reslurried in 2000 mL water in a reaction flask equipped with a reflux condenser and mechanical stirring. The stirred mixture was heated to the reflux temperature and then refluxed for two hours at the reflux temperature of 98° C. The mixture was cooled to 50° C., and then was vacuum filtered across a 40-60° C. fritted glass funnel. The filtrate, referred to as FILTRATE A, which contained corn hull hemicellulose, was retained. The retained solids were reslurried in 2000 mL water in a reaction flask equipped with a reflux condenser and mechanical stirring. The stirred mixture was heated to the reflux temperature and then refluxed for two hours at the reflux temperature of 98° C.

The mixture was cooled to 50° C., and then it was vacuum filtered across a 40-60° C. fritted glass funnel. The filtrate, referred to as FILTRATE B, containing the corn hull hemicellulose, was retained. The retained solids were reslurried in 2000 mL water in a reaction flask equipped with a reflux condenser and mechanical stirring. The stirred mixture was heated to the reflux temperature and then refluxed for two hours at the reflux temperature of 98° C. The mixture was cooled to 50° C., and then it was vacuum filtered across a 40-60° C. fritted glass funnel. The filtrate, referred to as FILTRATE C, containing the corn hull hemicellulose was retained. The combined FILTRATES A, B, and C containing the corn hull hemicellulose were assayed to contain 54.5 g solids Combined filtrates A, B, and C then were spray dried.

The resulting hemicellulose was formulated into an adhesive paste by mixing 15 parts weight hemicellulose of the spray-dried hemicellulose with 85 parts water.

EXAMPLE 5

Preparation of Adhesive Composition

Five hundred g dry basis corn hulls containing 766 g water was added to sufficient water to give a total weight of 5000 g. The stirred slurry was heated and maintained at 82° C. to 96° C. for two hours. The hot slurry was then filtered through a No. 60 Mesh A.S.T.M.E. Standard Testing Sieve.

The retained solids were subjected to a second treatment of slurrying, stewing, and filtering. The retained solids from the second treatment were subjected to a third treatment of slurrying, stewing, and filtering. The retained solids were crumbled, placed on screens, and allowed to air-dry at room temperature.

One hundred g dry basis of the treated corn hulls were added to a solution already containing 1610 mL 190 proof ethanol, 390 mL water, and 20 g 50% NaOH in a reaction flask equipped with a reflux condenser and mechanical stirring. The stirred reaction mixture was heated to the reflux temperature and then refluxed for three hours at the reflux temperature of 78° C. The reaction mixture was cooled to 40° C., and then it was vacuum filtered across a 40-60° C. fritted glass funnel. The retained solids were returned to the reaction flask and reslurried in a solution already containing 1610 mL 190 proof ethanol and 390 mL water. The slurry was heated to reflux temperature and then refluxed for one hour at the reflux temperature of 78° C. The reaction mixture was cooled to 20° C., and then it was vacuum filtered across a 40-60° C. fritted glass funnel. The retained solids were reslurried in a solution already containing 1610 mL 190 proof ethanol and 390 mL water at 20° C., and then the pH of the slurry was adjusted to 6.5 with 5.8N hydrochloric acid. The slurry was then vacuum filtered across a 40-60° C. fritted glass funnel. The retained solids were dried in an oven at 100° C.

The resulting dried solids comprised a mixture of hemicellulose and cellulose. This mixture, known as holocellulose, was were formulated into an adhesive paste by mixing 15 parts by weight solids with 85 parts water.

EXAMPLE 6

Pelleted High-Fat Animal Feed

A master batch of horse feed ration containing full fat corn germ from a corn wet-milling process was formulated in a Hobart mixer. The feed was formulated from the following components:

| Ground Full-Fat Corn Germ | 36.8% |
| Wheat Midds | 33.1% |
| Ground Whole Corn | 17.9% |
| Soybean Meal | 9.5% |
| Corn Oil | 0.5% |
| Calcium Carbonate | 1.1% |
| Dicalcium Phosphate | 1.1% |

The feed was assayed to have the following components:

| Vegetable Fat (corn oil) | 20% |
| Protein | 15% |
| Fiber | 7% |
| Ash | 5% |

To an aliquot of the master batch was added the adhesive prepared in accordance with Example 1A in liquid and dry form in an amount sufficient to constitute 5% of the total dry mass of the final pelleted feed. The mixture was then converted into a pelletized horse feed using a California Pellet Mill. Conditions in the mill were as follows:

| Feed Rate | 1 lb./min. |
| Feed Moisture | 9.0% |
| Conditioner Temperature | 145° F. |
| Mill Die | 3/16 in. × 1½ in. |
| Mill RPMs | 450 |
| Mill amps | 2.8 |
| Temperature | 145° F. |
| Moisture | 10.5% |

The durability of the pelleted animal feed was measured by subjecting 100 g of the feed to 20 minutes of RoTap sieve shaker action (Model 125-94, Type RoTap-11-DS, W. S. Tyler, 8570 Tyler Blvd., Menton, Ohio 44060) on a U.S. standard 16 mesh screen. This method was adapted from the method disclosed in AOAC Official Methods of Analysis (1990) Method 965.22 ("Sorting Corn Grits"). The mass of the material passing through the screen was then weighed, and the weight calculated as a percentage of the original 100 g to provide a durability figure. In this experiment, the lower the durability value, the better the durability of the pelleted animal feed. Using this procedure, the pellets were found to have a durability of 0.05.

COMPARATIVE EXAMPLE 1

Animal feeds were prepared as in Example 6, except that instead of the binder of Example 1A, other binders were employed. As a control, pellets were prepared using no binder. The feeds thus prepared were tested for durability as in Example 6. The binders and the durabilities observed using each binder are set forth in the table below.

| Binder | Durability |
| --- | --- |
| None | 12.0 |
| Calcium Carbonate | 12.8 |
| Bentonite | 12.0 |
| Starch | 10.1 |
| Corn Gluten | 5.0 |
| Lignin Sulfonate | 5.0 |

Comparing the durabilities observed using the binders of Comparative Example 1 with the durability observed in connection with the animal feed of Example 6, it is seen that the durability of the animal feed of the invention is substantially superior to the animal feeds of the comparative example.

EXAMPLE 7

An animal feed was formulated as follows:

| Ingredient | Weight % |
| --- | --- |
| Corn Germ | 35% |
| Wheat Midds | 31.5% |
| Whole Ground Corn | 17% |
| Soybean Meal | 9% |
| Hemicellulose | 5% |
| Calcium Carbonate | 1% |
| Dicalcium Phosphate | 1% |
| Corn Oil | 0.5% |

The foregoing ingredients were combined to form a mixture, and the mixture was palletized in a California Pellet Mill to yield an animal feed. In this formulation, the wheat midds were included to provide a source of fiber. The soybean meal was included to provide a source of protein, and the calcium carbonate and dicalcium phosphate were included as mineral calcium sources.

The feed was evaluated for palatability by providing the feed to a 10-year old gelding quarterhorse. After the animal ate the feed, no digestive disorders were observed.

EXAMPLE 8

A master batch horse ration formula having the following composition was prepared:

| | |
|---|---|
| Full-Fat Corn Germ | 36% |
| Wheat Midds | 36% |
| Ground Corn | 15% |
| 48 Soybean Meal | 6.5% |
| Distillers Dried Grain | 2% |
| Calcium Carbonate | 1% |
| Dried Whole Wheat | 1% |
| Dehydrated Alfalfa | 1% |
| Dicalcium Phosphate | 1% |
| Flavorized Vegetable Oil | 0.5% |

A horse feed was prepared by mixing the binder of Example 1A to a total dry weight % of 5%.

EXAMPLE 9

Horse feeds were prepared as in Example 6, except that various forms of the hemicellulose binder (extruded dry powder, spray dried powder, and liquid) were employed in various amounts. Each feed thus prepared was evaluated for durability using the procedure set forth in Example 6 and for fines. The feed compositions and measured fines and durabilities are set forth below:

| Example | Binder Form | Binder % (dsb) | Fines | Durability |
|---|---|---|---|---|
| 9A | extruded dry powder | 7.0 | 0.16 | 1.8 |
| 9B | extruded dry powder | 5.0 | 0.04 | 1.0 |
| 9C | extruded dry powder | 2.5 | 0.14 | 1.7 |
| 9D | spray dried powder | 5.0 | 0.02 | 0.4 |
| 9E | spray dried powder | 2.5 | 0.14 | 1.0 |
| 9F | spray dried powder | 1.0 | | |
| 9G | liquid | 1.3 | | 0.7 |
| 9H | liquid | 0.65 | 0.12 | 0.6 |
| 9I | liquid | 0.32 | 0.12 | 0.8 |
| 9J | liquid | 1.3 | 0.04 | 0.9 |
| 9K | liquid | 0.65 | 0.06 | 1.1 |
| 9L | liquid | 0.32 | 0.06 | 1.1 |

Fines were measured via RoTap analysis for 10 seconds using equipment described hereinabove; prior to measuring durability. The weight of material passing through the sander was calculated as a percentage of the original 100 grams;

As seen, the feed pellets were very durable, with low fine levels.

COMPARATIVE EXAMPLE 2

Example 9 was repeated, except that various non-hemicellulose binders wee evaluated. The following results were obtained:

| Example | Binder | Binder % (dsb) | Fines | Durability |
|---|---|---|---|---|
| C-2A | None | — | 0.52 | 9.6 |
| C-2B | Calcium Carbonate | 5.0 | 0.28 | 6.2 |
| C-2C | Bentonite | 5.0 | 0.28 | 6.9 |
| C-2D | Starch | 10.0 | 0.62 | 11.3 |
| C-2E | Starch | 15.0 | 0.78 | 10.1 |
| C-2F | Corn Gluten | 5.0 | 0.18 | 5.1 |
| C-2G | Lignin Sulfonate | 5.0 | 0.1 | 4.5 |

As seen via a comparison of this data to that of Example 9, the durabilities of the feeds of the invention were substantially superior to those of the other feeds. The levels of the fines of the feeds of the invention also generally were comparable or superior.

Thus, it is seen that the invention provides an animal feed having excellent properties. A high-fat animal feed may be prepared in accordance with the teachings herein. The feed can be made to comprise particles that are very durable and that have low fines levels. Moreover, the handling difficulties attendant with spraying fat onto a lower-fat feed can be avoided.

While particular embodiments of the invention have been shown, it will be understood that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and scope of the invention. All references cited herein and prior provisional application 60/216,083 filed Jul. 6, 2000 are hereby incorporated by reference in their entireties.

What is claimed is:

1. An animal feed comprising:
   a fat, said fat being present in an amount effective to provide nutritive fat to an animal, said fat comprising a vegetable fat present in an amount of at least 15% by weight;
   a solid nutritive source, said source being selected from the group consisting of soy, oats, sorghum, whole wheat, whole rice, whole corn, and whole barley; and
   a hemicellulose binder, said animal feed being in the form of discrete plural particles of a size suitable for feeding to an animal, said hemicellulose binder being present in each of said particles in at least an amount effective to improve intraparticle cohesion said hemicellulose binder comprising extruded alkali treated corn hulls.

* * * * *